[11] 3,581,140

| [72] | Inventor | Raymond E. Paquette |
| | | Saratoga, Calif. |
| [21] | Appl. No. | 736,082 |
| [22] | Filed | June 11, 1968 |
| [45] | Patented | May 25, 1971 |
| [73] | Assignee | Varo, Inc. |
| | | Garland, Tex. |

[54] HIGH INTENSITY LIGHT SOURCE WITH INTEGRAL RADIANT-ENERGY-COUPLING APPARATUS
6 Claims, 3 Drawing Figs.

[52] U.S. Cl. .................................................. 313/110,
313/111, 313/220, 350/96R
[51] Int. Cl. ..................................................... H01j 5/16
[50] Field of Search .......................................... 250/227;
350/96; 240/1 (EI); 313/112, 220, 8, 110, 111,
317, 318, 323, 324, 129

[56] References Cited
UNITED STATES PATENTS

| 2,241,968 | 5/1941 | Suits | 313/184 |
| 2,362,175 | 11/1944 | Swanson | 313/110 |
| 3,054,921 | 9/1962 | Lye | 313/112 |
| 3,101,411 | 8/1963 | Richards | 350/96X |
| 3,354,405 | 11/1967 | Bebb et al. | 350/96X |
| 1,048,433 | 12/1912 | Snively | 313/317X |
| 2,222,093 | 11/1940 | Swanson | 313/221X |

FOREIGN PATENTS

| 739,970 | 11/1955 | Great Britain | 350/96 |
| 747,917 | 10/1944 | Germany | 313/114 |

*Primary Examiner*—Raymond F. Hossfeld
*Attorney*—Lowhurst & Hamrick

ABSTRACT: An optically efficient light-transmitting rod is formed integral with the envelope of a high intensity illumination producing means such that one end of the rod is positioned proximate the luminant source, and the other is shaped into a suitable utilization form or is adapted so as to provide a means with which to couple the radiant energy to a utilization means.

PATENTED MAY 25 1971 3,581,140
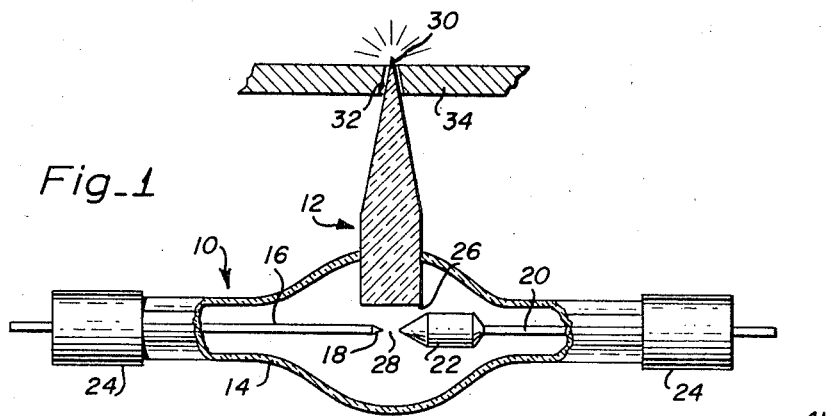
Fig_1
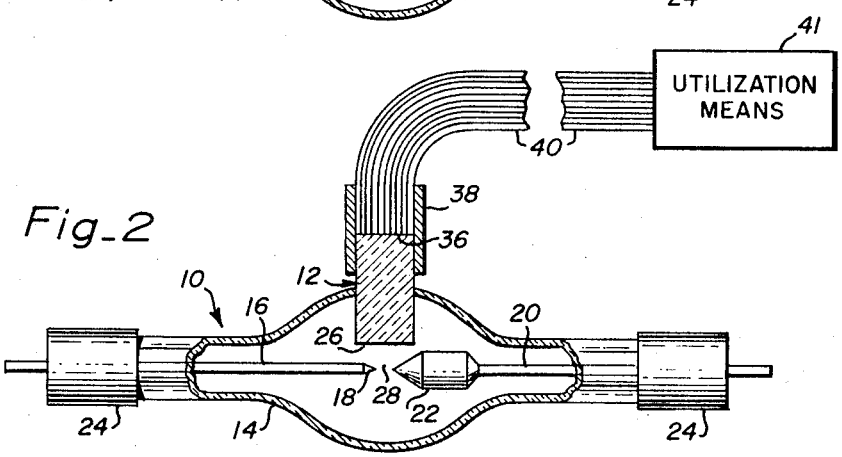
Fig_2
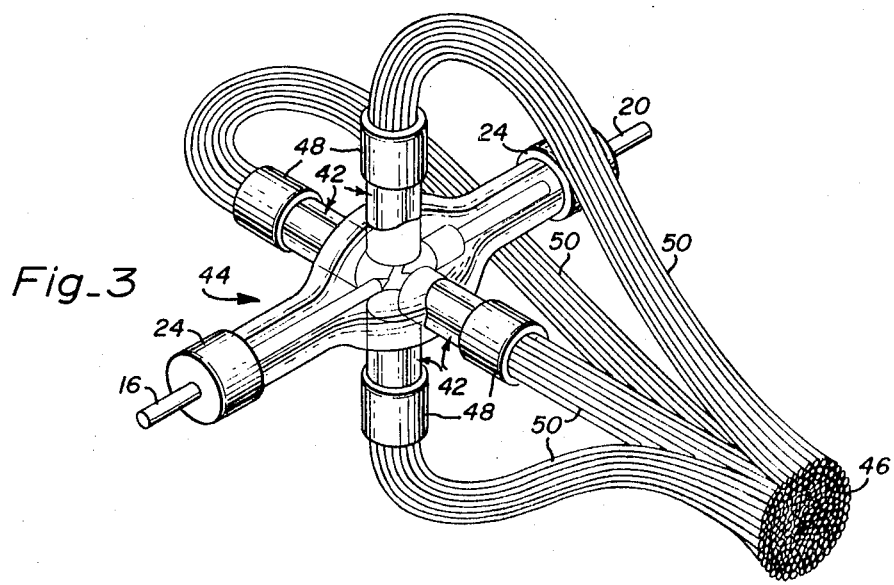
Fig_3
INVENTOR
RAYMOND E. PAQUETTE
BY Harvey J. Lonhunt
ATTORNEY 3,581,140

HIGH INTENSITY LIGHT SOURCE WITH INTEGRAL RADIANT-ENERGY-COUPLING APPARATUS

BACKGROUND OF THE INVENTION

1. Field of the Invention

This invention relates generally to high intensity light source apparatus, and, more particularly, to a unitized light source and optical transmission structure which is designed to provide a simple and highly efficient means for coupling high intensity light to a utilization device or transmission media.

2. Description of the Prior Art

There are many applications in which a high intensity "point source" of light is required. In planetarium use, for example, a point source is required which radiates uniformly from the point so as not to produce a partial shadow or pneubra effect on objects illuminated thereby. In such a case it is generally desirable that the light source unit be compact in size and of such a physical configuration that any heat generated by the source can be easily removed by fluid conversion or other suitable means without effecting the illuminating capability of the source and optical coupling apparatus.

Another and perhaps more important application is in the rapidly expanding field of fiber optics wherein a high intensity source of light is required for supplying illumination which can be channelled through the light-transmitting fibers. Endoscopy devices used in the medical field for supplying "cold light" at remote, hard to reach points, are specific examples of such apparatus and generally include a bright light source, the illuminance of which is passed through a light-condensing or optical focusing lens system so as to concentrate the illumination over the small cross-sectional end area at the entrance end of the fiber bundle.

Still another area in which a high intensity source of illumination is required is the laser/maser field wherein the source is used to pump the laser or maser fiber or crystal to an excited state. An example of this application is disclosed in U.S. Pat. No. 3,354,405 to Bebb et al.

In all of the above examples and in nearly every prior art application it has been necessary to provide some type of light-focusing means which is disposed between the lamp and the intended focal point so as to concentrate as much of the available light as possible at a given point or over a given small surface area. Pertinent examples of some of the means used in the prior art to concentrate the light from a source are disclosed in U.S. Pat. No. 3,101,411 to Richards.

Numerous disadvantages are experienced in the prior art because of this focusing requirement and the available means by which it is accomplished. For example, the focusing means is usually located outside of and generally spaced from the actual lamp structure. This means that the illumination must first diffuse through the envelope of the lamp before it is available for utilization, thus resulting in an immediate intensity loss. Likewise, the focusing means must usually be spaced from the source so that the lens or reflection system can properly perform its intended light-converging function. The basic laws of optical physics dictate the dispersive losses suffered as a result of this spacial separation. In addition, an appreciable loss of intensity is experienced in passing through the lens of the optical condensing apparatus which must also be spaced from the point which is to receive the light. All of these disadvantages, as well as limit of space requirements, heat dissipation problems, optical aberrations, etc., are quite material to the efficiency of the effective source of illumination.

OBJECTS OF THE INVENTION

It is therefore a principal object of the present invention to provide a novel combination of light source and optical coupling means which will substantially overcome the inherent disadvantages of the prior art.

Another object of the present invention is to provide a novel means for producing a point source of high intensity light without use of the conventional light-condensing lens or reflection structure commonly utilized in the prior art.

Still another object of the present invention is to provide a novel optical coupling means for efficiently coupling a high intensity light source to a light-conducting optical fiber bundle or other utilization means.

Still other objects and advantages of the present invention will become apparent after a reading of the following specification which makes reference to the drawing in which:

BRIEF DESCRIPTION OF THE DRAWINGS

FIG. 1 illustrates one embodiment of a light-coupling means in accordance with the invention;

FIG. 2 illustrates an alternative embodiment of a light-coupling means in accordance with the present invention; and FIG. 3 illustrates a still further embodiment of an optical coupling means in accordance with the present invention.

DESCRIPTION OF THE PREFERRED EMBODIMENT

Referring now to the drawing, there is shown in FIG. 1 a preferred embodiment of the invention which provides a point source of high intensity illumination and which includes a lamp 10 having an integral optical coupling rod means 12. The lamp 10 which provides the source of radiant energy may comprise an incandescent-type radiator, a strobotron, or any other type of illuminating means, but preferably is of the electrical discharge type such as the short arc, high-pressure, mercury vapor or other gas filled arc lamps well known in the prior art. Since the subject invention has a wide range of utility it is also desirable that the lamp be of a type capable of producing an illuminance which can be rapidly pulsed on and off or modulated in intensity.

Lamp 10 typically includes an elongated envelope 14 of glass or quartz which is sealed at either end to enclose an ionizable gas such as Xenon, mercury vapor, neon, argon, etc. Through one end of the envelope 10 there is passed an electrically conducting element 16, typically of tungsten, which extends a predetermined distance into the envelope and along its axis of symmetry, and then terminates to form a cathode electrode 18. A similar conductor 20 is likewise passed through the other end of the envelope 10 which terminates in a configuration suitable for providing an anode electrode 22. Metallic cap means 24 are provided at either end of envelope 12 for protecting the ends of the envelope and providing terminal means to which a suitable energizing potential supply means may be connected.

Extending through the bulbular portion of the envelope 10 is a light-coupling element in the form of a quartz rod 12 which is fused in gastight relation to the wall of the envelope 12. End face 26 of rod 12 is extended into the envelope 10 to a point proximate the arc gap 28 separating cathode 18 and anode 22 so that the intense radiation emanating from the arc created thereacross will be incident on the end 26. The end 26 may be a flat planar surface normal to the axis of rod 12 where the rod diameter is small, or may be of a slightly curved configuration so that the radiation originating at the arc in gap 28 impinges on the end of the rod normal to its surface.

The other end of the quartz rod 12 in this embodiment is conically tapered to a "point" 30. The half angle of the conical portion is chosen flat enough so that substantially all of the incident energy entering end 26 is internally reflected off the sides of the rod 12, and propagated in the direction of the "point" 30 whereby it emerges through a very small end area of suitable configuration. Although the external surfaces of the rod 12 in the preferred embodiment are usually polished surfaces, it is contemplated that in some instances it might be desirable to coat certain portions of its surface so as to improve the internal light transmission properties of the rod. Where the device is used as a point source, the tip 30 may be passed through a small hole 32 in a wall or light-masking element 34 so that only the light emerging at the tip 30 is visible from the other side. By extending the length of rod 12 the ratio of thermal energy to luminant energy emitted at end 30 can be substantially reduced since the quartz rod, while being a good light transmitter, is a relatively poor heat conductor.

In FIG. 2 there is shown an alternate embodiment of the invention wherein the distal end 36 of the light-coupling rod 12 is adapted to receive a tubular sleeve member 38 quartz tubing or the like which forms a socket for receiving one end of a fiber optic bundle 40 which is extended into the socket to abut the end face 36 of the rod 12 so as to receive the radiated energy transmitted thereto from the arc lamp through the rod 12.

Although the optical fiber bundle shown here is depicted as being of the same diameter as the rod 12, it is contemplated that for certain applications this will not be the case, and it will be necessary to taper the rod 12 so as to provide a transition up or down to match the diameter of the bundle. This, however, is only necessary where it is desired to obtain the maximum optical efficiency. When the efficiency is not a critical factor, the inner diameter of the coupling socket may be reduced to receive fiber bundles of smaller diameter by merely utilizing a tubular section 38 of a suitably smaller inside diameter over that portion of its length which does not telescope on to the end of rod 12. Quite clearly, the embodiment shown is a very simple form of coupling means and may take any other suitable form, the principle requirement being that the end of the fiber bundle be mated flush with the end 36 of the rod 12 so as to insure good optical coupling between the end of the quartz rod 12 and the fiber bundle 40 leading to a utilization means 41.

In applications where it is desirable to couple as much radiant energy as possible into a relatively large bundle of optical fibers for transmission to a utilization device such as an endoscope or the like, the alternative embodiment shown in FIG. 3 may be utilized. In this embodiment a plurality of quartz rods 42 similar to that shown in FIG. 2 are radially spaced around the arc area of the lamp 44 so as to capture a substantially larger amount of the emitted radiation than is possible using a single coupling rod. The fibers of the bundle 46 are then suitably divided into subbundles 50, the ends of which are inserted into the respective sockets 48 of the rods 42.

As is readily apparent from the drawing, the embodiment of FIG. 3 makes highly efficient use of a substantially greater amount of the radiation generated by the lamp 44, and while the particular utilization illustrated shows all of the bundles 50 being combined into a single trunk 46, it is to be understood that the light available from the respective coupling rods 50 could just as well be coupled into completely independent utilization means through independent light bundles 50. Furthermore, the number of rods 42 which may be used in a multiple coupling embodiment of the general type shown is only limited by space availability around the source of radiation. Any rod 42 which can be placed such that the source radiation will impinge upon its end surface substantially normal thereto will constitute a useful coupling element.

The advantages of this novel apparatus over the prior art devices are manyfold. For example, this apparatus is substantially more compact than any known lamp and light-coupling combination, and thus requires less housing volume. No external optical focusing means are required to localize the radiant energy supplied by the lamp, and, since there are no air gaps external of the tube envelope in the light transmission path, between the source and the optical coupling elements, almost any type of fluid cooling system may be used, including opaque liquids which can be passed directly in contact with the lamp.

While the invention has been described with particular reference to several specific embodiments, many alterations and modifications can be made to the device without departing from the merits of the invention. It is therefore to be understood that I intend for the appended claims to be interpreted in accordance with the true spirit and scope of the invention, and not to be limited by the particular illustrative embodiments disclosed.

What I claim is:

1. A unitary light source and coupling device comprising:
   an arc lamp including a pair of spaced-apart electrodes and an elongated envelope, hermetically enclosing said electrodes, the adjacent extremities of said electrodes defining an arc gap; and
   an elongated, solid light-coupling means having one end thereof passing through said envelope to a point closer to said arc gap than is the inner wall of said envelope, said light coupling means being hermetically sealed to said envelope with the other end thereof being located external of said envelope whereby light from an arc struck across said arc gap and incident upon said one end of said light-coupling means is passed through said coupling means for utilization.

2. A unitary light source and coupling device as recited in claim 1 wherein said coupling means is a quartz crystal optically transparent in the direction from said one end to said other end.

3. A unitary light source and coupling device as recited in claim 1 wherein said other end of said coupling means is conically tapered, the terminal portion being of substantially reduced cross-sectional area so as to effectively provide a point source of light.

4. A unitary light source and coupling device as recited in claim 1 wherein the end surface of said one end of said coupling means is of a concave configuration so that said incident light is caused to strike said end surface substantially normal thereto.

5. A unitary light source and coupling device as recited in claim 1 wherein a plurality of said elongated light-coupling means are positioned about said arc gap.

6. A unitary light source and coupling device as recited in claim 1 wherein said other end of said coupling means includes means for coupling light transmitted therethrough into the end of a fiber optics apparatus for utilization.